(Model.)
C. & J. CLOSZ.
GRAIN SEPARATING SCREEN.
No. 494,290. Patented Mar. 28, 1893.
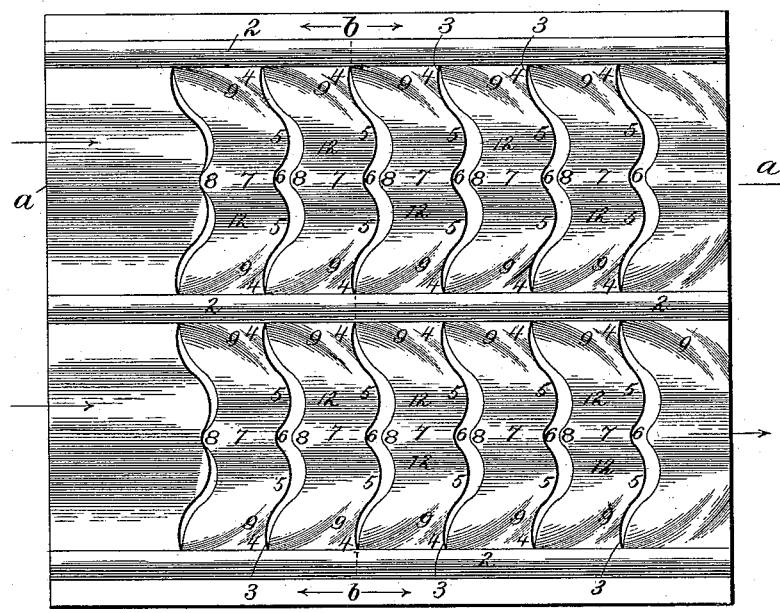
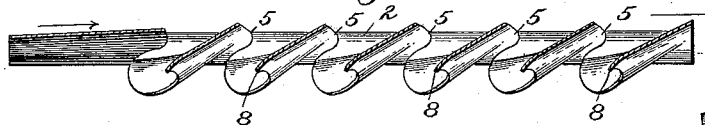
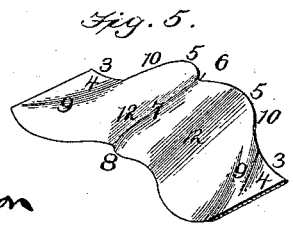
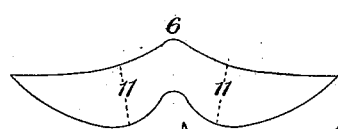
Witnesses
Inventors
Charles Closz
Jacob Closz
By John ... Johnson
their Attorneys.

UNITED STATES PATENT OFFICE.

CHARLES CLOSZ AND JACOB CLOSZ, OF ST. ANSGAR, IOWA.

GRAIN-SEPARATING SCREEN.

SPECIFICATION forming part of Letters Patent No. 494,290, dated March 28, 1893.

Application filed April 16, 1892. Serial No. 429,414. (Model.)

*To all whom it may concern:*

Be it known that we, CHARLES CLOSZ and JACOB CLOSZ, citizens of the United States, residing at St. Ansgar, in the county of Mitchell and State of Iowa, have invented certain new and useful Improvements in Grain-Separating Screens, of which the following is a specification.

For cleaning and separating grain from chaff, straw, weeds, husks, silks, cobs, &c., we have provided an improved sheet metal corrugated platform screen for use in separators and cleaners for preparing grain for milling. In its construction, the surface of the screen and its peculiar form of openings produced from bow shaped cuts, constitutes the essential features of our invention and is designed to give the most effective separating and cleaning action to the grain as its moves forward over the screen, and to prevent clogging or choking of the openings.

In the claims concluding this specification we will point out the novel features of this screen in connection with the accompanying drawings, in which—

Figure 1 shows our new screen in top view. Fig. 2 is a vertical longitudinal section on the line *a* of Fig. 1. Fig. 3 is a cross section on the line *b* looking toward the receiving end of the screen. Fig. 4 is a like section looking toward the discharge end of the screen; and Fig. 5 shows in perspective one of the surface lobed divisions formed between the cuts and which form the boundaries thereof. Fig. 6 shows a diagram of the opening; and Fig. 7 shows in top view one of the lobed divisions.

The screening platform is preferably constructed of a single sheet of metal with longitudinal parallel raised corrugations 2 and between these corrugations, transverse cuts are made of such distance apart as to produce comparatively narrow transverse sections. Each section is raised at one edge of the cut and depressed at the other, and is corrugated to form an elevated double lobed transverse ridge, standing toward the tail end of the screen, overhanging the opening and forming between the lobes a receding edge curving upward from which a convex-surfaced ridge stands centrally toward the receiving end of the screen and terminates at the under edge of the opening. This construction, in connection with the surface conformation on each side of the central convexity or ridge, gives the best effect in directing the grain into the openings and directing the straw and foreign matters over such surface conformation and along the walls of the corrugations. These bow-shaped openings extend from the base of one corrugation to the base of the next, and back of the forward standing edge 3, the surface has a slight concave triangular space 4 along the base of each corrugation from which triangular shaped space 4 said edge rises in a lobe 5 at each side of a longitudinal center line of the openings. Between these lobes 5 the said edge recedes into said center line and terminates at its highest point 6 in an elevated convex-surfaced ridge 7 which stands longitudinally of, and toward the receiving end of the screen and terminates in a point 8 at the under edge of the next preceding opening about on a level with the triangular surfaces 4 along the corrugations 2. These lower ridge points 8 are the counter part of the upper edge lobed or scalloped conformation and from each ridge 7 the surface slopes laterally in a gentle concave corresponding with the lobed edge and rising in the curve to the points of the cuts. The surface between the raised and depressed edges is divided by an oblique convexity or ridge 9 which extends from the lobe edge at 10 to the point of the cut and separates the triangular spaces 4 at the elevated edge of the cut from the sloping concave surface at the depressed edge of the cut. The openings formed by these edge conformations give the widest parts of the openings at points 11 between the overhanging lobes and the under sloping surface, and from these points the opening gradually decreases in width to the extreme points and to the receding center or scallop between the lobes, as seen in Fig. 6. This construction gives a longitudinal surface ridge between the lobes, formed by the receding points 6, which are higher than the lobes and slope backward showing an opening of bow shape. The bow shaped elevated edge is particularly effective in facilitating and aiding the forward movement of the grain over the openings and directing it into them and permitting an effective blast through the openings and over the sloping backs of the raised lobed sections; and in providing an efficient screening capacity and due rigidity of the screen surface.

It is important to notice that the conformation of the center raised edges of the transverse surface sections form, by their receding highest points and lobes standing forward on each side of said receding highest points, a series of transverse scallops or steps at the elevated edge, the lobes forming two of the steps and the receding point the intermediate step, and it is this construction, given by the bow shaped cut, which conduces to the effectiveness of the movement of the grain and foreign matters over the screen with satisfactory cleaning and separating action.

The platform can be of any suitable length and width and may be framed if desired. The receding or edge indentations may be deeper, and the lobes may be more pointed, but we prefer the bow shaped edge lobed or scalloped, as shown; and we prefer to give the convex central ridge surfaces a pitch of about thirty degrees from which ridge the surface slopes into the side concave surfaces 12 which extend along the oblique ridges 9 to the points at the base of the corrugations.

The screen as an entirety has a surface conformation, consisting of longitudinal ridges dividing it into channels, intermediate longitudinal series of transverse bow-shaped cuts, the material between each two cuts being formed at its inner or rear edge with a central point or lobe 8 and at its forward or outer edge with a central indentation or hollow 6 between two lobes 5, 5, and bent upwardly toward the forward edge, each surface corrugated to form a central longitudinal ridge 7, terminating in the central rear point or lobe 8 and formed with lateral oblique ridges 9, converging forwardly and terminating in the two side lobes, 5, 5, and depressions 12, 12, and 4, 4, between the central and diagonal ridges 7 and 9, and between the longitudinal and the diagonal ridges 2 and 9.

We claim as our improvement—

1. A sheet metal platform-screen formed with longitudinal rows of openings produced from approximately bow-shaped cuts, in transverse relation, the raised edges of the metal between each two cuts overhanging one of said openings in forwardly projecting lobes divided by an indentation or hollow, and formed with a convex surfaced ridge extending from the said indentation to the depressed edge of the next preceding cut, substantially as described.

2. A sheet metal platform-screen formed with longitudinal rows of openings produced from approximately bow-shaped cuts in transverse relation, the raised edges of the metal between each two cuts overhanging one of said openings in forwardly projecting lobes terminating in a higher intermediate receding scallop or indentation formed with a sloping convex ridge terminating in a point or lobe in the depressed edge of the next preceding cut, substantially as described.

3. A sheet metal platform-screen having longitudinal rows of openings produced from approximately bow-shaped cuts in transverse relation, the forwardly standing edge of the metal between each of two cuts being raised and having lobes forming a double transverse ridge standing toward the tail end of the screen overhanging said opening, substantially as described.

4. A sheet metal screen having longitudinal rows of transverse openings produced from approximately bow-shaped cuts, the metal between each two cuts forming an elevated double lobed transverse ridge standing toward the tail end of the screen overhanging said openings and sloping backward to a lower point or lobe and standing inward and also sloping laterally from said forward lobes to give the greatest width of opening under said lobes, substantially as described.

5. A sheet metal screen formed with longitudinal ridges 2 dividing it into channels, intermediate longitudinal series of transverse bow-shaped cuts, the material between each two cuts being formed at its inner lower edge with a central point or lobe 8 and at its forward or outer edge with a central indentation or hollow 6 between two lobes 5, 5, and bent upwardly toward the front edge, corrugated to form a central longitudinal ridge 7 terminating in the central point or lobe 8, and formed with lateral oblique ridges 9 converging forwardly, and terminating in the two lobes, rearwardly sloping depressions 12, 12, between the central and diagonal ridges and forwardly sloping triangular depressions 4, 4, between the diagonal ridges and the longitudinal ridges 9 and 2, substantially as described.

In testimony whereof we have hereunto signed this specification in the presence of witnesses.

CHARLES CLOSZ.
JACOB CLOSZ.

Witnesses:
MARTIN MOE,
LARS MOE.